(No Model.)
W. MOACKLER.
APPARATUS FOR RENDERING FATS, &c.
No. 264,189. Patented Sept. 12, 1882.
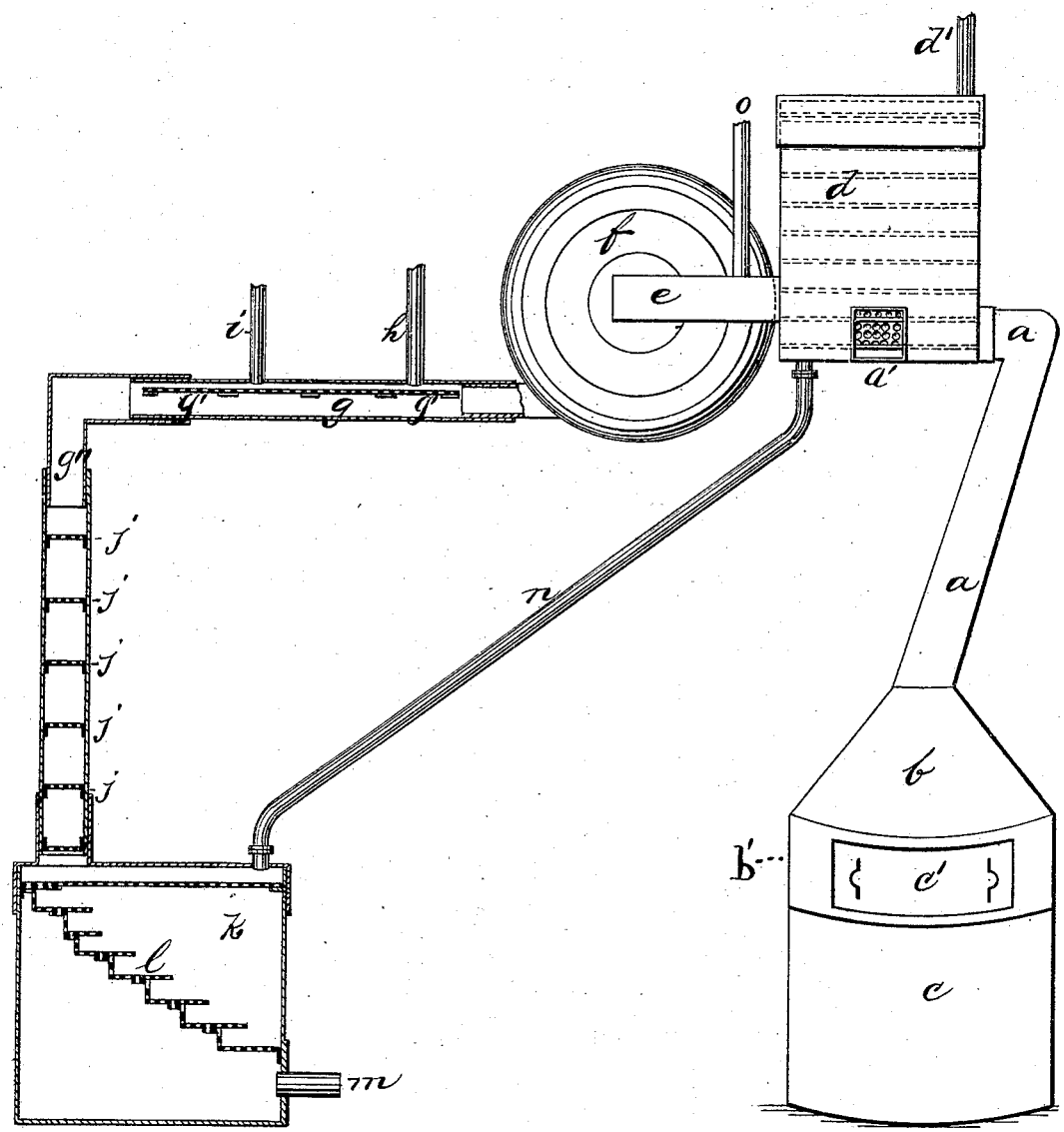
WITNESSES:
INVENTOR
William Moackler
by Wetmore Jenner
and Thompson his
Attys.

ns of this text.

UNITED STATES PATENT OFFICE.

WILLIAM MOACKLER, OF NEW YORK, N. Y.

APPARATUS FOR RENDERING FATS, &c.

SPECIFICATION forming part of Letters Patent No. 264,189, dated September 12, 1882.

Application filed May 31, 1882. (No model.)

*To all whom it may concern:*

Be it known that I, WILLIAM MOACKLER, of the city of New York, county and State of New York, have invented a new and useful apparatus for rendering fats and similar bodies, whereby the gases, vapor, steam, &c., as soon as they come from the fat, are caught, washed, and condensed, of which the following is a specification.

My invention is especially applicable to the rendering of animal fats, and by its use the atmosphere in the neighborhood of the rendering apparatus is kept free from disagreeable and deleterious odors.

The following is a full, clear, and exact description of my apparatus and process, having reference to the accompanying drawing.

$c$ is the melting-tank, into which the fat is put through the door $c'$. It may be heated in any known way.

$b$ is a dome built upon the upper edge of the tank, and preferably the walls of it run vertically up for the distance (in a tank capable of melting, say, six thousand pounds) of about a foot and a half, as shown at $b'$. It then contracts in the shape of an inverted funnel and terminates in a large pipe, $a$. This pipe $a$ extends upward and connects with a scrubber, $d$, which is a box containing a set of perforated shelves or step-like devices. The pipe $a$ enters the scrubber-box at the lower part thereof, and at the upper part a pipe, $d'$, admits water into the scrubber-box. Pipes corresponding to the pipe $a$, leading from other tanks, may enter the scrubber-box $d$. The opening for one such pipe is shown at $a'$.

$e$ is a pipe which leads from the scrubber-box $d$ to the fan $f$. This fan sucks the air from the pipe $e$. It discharges into a long pipe, $g$, in the upper part of which is a shallow pan, $g'$, with a perforated bottom. This pan should be about as wide as the pipe $g$. Pipes $i$ and $i$ supply water to the pan $g'$.

$g''$ shows a descending extension of the pipe $g$; and in it are a series of the perforated partitions $j j j$, &c.

$k$ is another scrubber-box, and it has in it a series of scrubber-steps, well known in such devices and need not be described by me.

$n$ is a pipe connecting the bottom of the scrubber-box $d$ with the scrubber-box $k$, and $o$ is a water-pipe opening into the pipe $e$.

$m$ is a pipe connecting the bottom of the scrubber-box $k$ with the sewer or any other suitable outlet.

Prior to my invention the rendering of animal fats and similar bodies in densely populated localities has been attended with much inconvenience to those living in the neighborhood, because of the offensive and deleterious odors which are created by the process; and many apparatuses have been devised for removing the gases, vapors, &c., which rise from the rendering-tanks, and various kinds of condensers and scrubbers have been used to effect this purpose; but all the apparatuses that I am acquainted with have been defective, because they did not completely remove the noxious gases or vapors, but left some taint in the air which carried them.

My apparatus furnishes a combination of devices which are so arranged and operated that none of the gases or vapors can escape from the rendering-tanks, and they are all completely washed of all impurities and also condensed. It also draws the impure atmosphere from the apartment in which the melting-tanks are placed. All my devices being scrubbers, and not condensers merely, the gases and vapors are thoroughly washed by coming into actual contact with the water, and are also condensed, and all objectionable matter removed from them.

The operation is thus: The fan being put in motion, all the gases and vapors which escape from the fat are caught in the dome $b$, and are carried upward by the suction into the scrubber-box $d$, where they are brought into contact with the water which enters the scrubber $d$ through the pipe $d'$. They are then drawn through the pipe $e$ into the fan $f$, and the water which enters the pipe $e$ through the pipe $o$ (there being a sprinkler on the end of the pipe $o$, which sprays the water) is also drawn into the fan $f$, and is thrown by the wings thereof into contact with the gases, vapor, &c., inside the fan. The fan then throws the gases and vapors into the pipe $g$, and in this pipe they are subjected to a shower of water which falls from the perforated pan or trough $g'$. The water is supplied to this trough through the pipes $i\ i$. The gases and vapors then pass downward through the vertical part of the pipe $g$, (shown at $g''$,) and are carried by the blast of air with the water through the perforated partitions $j\ j\ j$, &c., and in so doing are again thoroughly washed and purified. They then pass into the second scrubber-box, $k$, and over the step-like device $l$, where the condensation and scrubbing action are completed. The water and the air, which is now perfectly freed from all impurities, then pass away by the escape-pipe $m$ to the sewer. The pipe $n$ conducts the water which enters the scrubber-box $d$ to the scrubber-box $k$, whence it flows off through $m$; or the pipe $n$ may lead to any other desired drain.

By the interposition of the scrubber-box $d$ between the tank and the fan the gases and vapors are somewhat cooled before they enter the fan. Thus it is not subjected to the great degree of expansion and contraction which would be the case if the gases, &c., entered the fan as hot as they were when they came from the tank. Therefore the rattle of the fan-shaft consequent upon its first starting when cold and when the shaft is smaller than its journal-boxes is avoided.

I do not claim broadly the catching of the gases, vapors, &c., as they come from the fat, and then drawing them off into a condensing or a scrubbing device; but What I do claim is the peculiar combination of devices shown—that is to say:

1. The combination of the tank $c$, the dome $b$, the pipe $a$, the scrubber-box $d$, the water-pipe $d'$, the pipe $e$, the water-pipe $o$, the fan $f$, the pipe $g$, the perforated trough $g'$, the pipes $i$, the perforated partitions $j\ j$, the scrubber-box $k$, and the pipes $m$ and $n$, substantially as and for the purposes set forth.

2. The combination of the fan $f$, the induction-pipe $e$, and the water-pipe $o$, substantially as and for the purposes set forth.

3. The combination of the tank $c$, the dome $b$, the pipe $a$, the scrubber $d$, the water-pipe $d'$, the pipe $e$, the fan $f$, the pipe $g$, the perforated trough $g'$, the water-pipes $i$, the scrubber $k$, and the pipes $m$ and $n$, substantially as and for the purposes set forth.

WILLIAM MOACKLER.

Witnesses:
JOHN H. IVES,
JOHN J. O'BRIEN.